United States Patent [19]
Shah

[11] Patent Number: 5,564,273
[45] Date of Patent: Oct. 15, 1996

[54] GAS STREAM VAPORIZER

[75] Inventor: Vipin P. Shah, Dearborn Heights, Mich.

[73] Assignee: Ford Motor Company, Dearborn, Mich.

[21] Appl. No.: 502,797

[22] Filed: Jul. 14, 1995

[51] Int. Cl.⁶ ..................... F01N 3/00
[52] U.S. Cl. ............... 60/274; 60/284; 60/320; 60/276; 219/548
[58] Field of Search ............... 60/274, 300, 303, 60/276, 320, 284; 219/546, 548

[56] References Cited

U.S. PATENT DOCUMENTS

| | | | |
|---|---|---|---|
| 2,947,842 | 8/1960 | Rook | 219/546 |
| 2,995,646 | 8/1961 | Kawalle | 219/546 |
| 4,671,058 | 6/1987 | Yoshida et al. | 60/303 |
| 5,216,880 | 6/1993 | Aoki et al. | 60/300 |
| 5,431,886 | 7/1995 | Rolf | 60/300 |

*Primary Examiner*—Leonard E. Heyman
*Attorney, Agent, or Firm*—Peter Abolins

[57] ABSTRACT

An exhaust gas flow path for an internal combustion engine includes a vaporizer positioned upstream of an exhaust gas oxygen sensor. The vaporizer dissipates any liquid in the exhaust gas stream thus protecting the exhaust gas oxygen sensor from thermal shock.

2 Claims, 1 Drawing Sheet

GAS STREAM VAPORIZER

BACKGROUND OF THE INVENTION

1. Field of the Invention

This invention relates to electronic engine controls for an internal combustion engine. In particular, it relates to the use of sensors positioned in a gas stream and providing a signal indicating operating conditions of the engine.

2. Prior Art

Electronic engine control of an internal combustion engine is known. That is, operating conditions of the internal combustion engine are controlled by an electronic engine control module in response to sensing of various engine parameters.

For example, one parameter to be sensed is the amount of oxygen in the exhaust gas flow. To this end, an exhaust gas oxygen sensor is placed in the exhaust gas stream from the engine.

Operation of the exhaust gas sensor produces an output which is used to control air fuel ratio. The sensor produces a more accurate indicator of oxygen concentration when operating within a certain temperature range. To provide such a desired temperature range for the sensor it is known to use a heater for the oxygen sensor. It would be desirable to achieve this desired temperature range quickly. These are some of the problems this invention overcomes.

To protect such oxygen sensors it is known to provide a protection tube around the sensing element in the exhaust gas flow. However, for fast light-off of the sensor, in less than ten seconds, the engine is started and the oxygen sensor heater is powered up. During such a start of the engine, water, fuel or liquid particles in the exhaust gas flow could damage the oxygen sensor element and the protection tube. That is, when the heater is turned on, the sensing element and protection tube will heat up rapidly. When water particles in the exhaust gas flow come in contact with the sensing element, thermal shock could cause cracks in the ceramic especially at the colder ambient temperatures.

SUMMARY OF THE INVENTION

This invention teaches placing a vaporizer upstream of an exhaust gas oxygen sensor in the engine exhaust gas flow. The vaporizer prevents liquid fuel and water particles from reaching the oxygen sensor. Thus the vaporizer prevents thermal shock at the sensing element by removing the water, fuel and water particles from the exhaust gas flow. It also eliminates the lag that is currently experienced while the exhaust gas oxygen sensor slowly heats up to avoid thermal shock. Thus the vaporizer allows faster light off for the current sensor. As soon as the exhaust temperature reaches the required value, the vaporizer can be turned off. This conserves power. The operating life expectancy of an exhaust gas oxygen sensor is increased because it will only function in a more suitable environment.

DETAILED DESCRIPTION OF THE INVENTION

Figure 1:
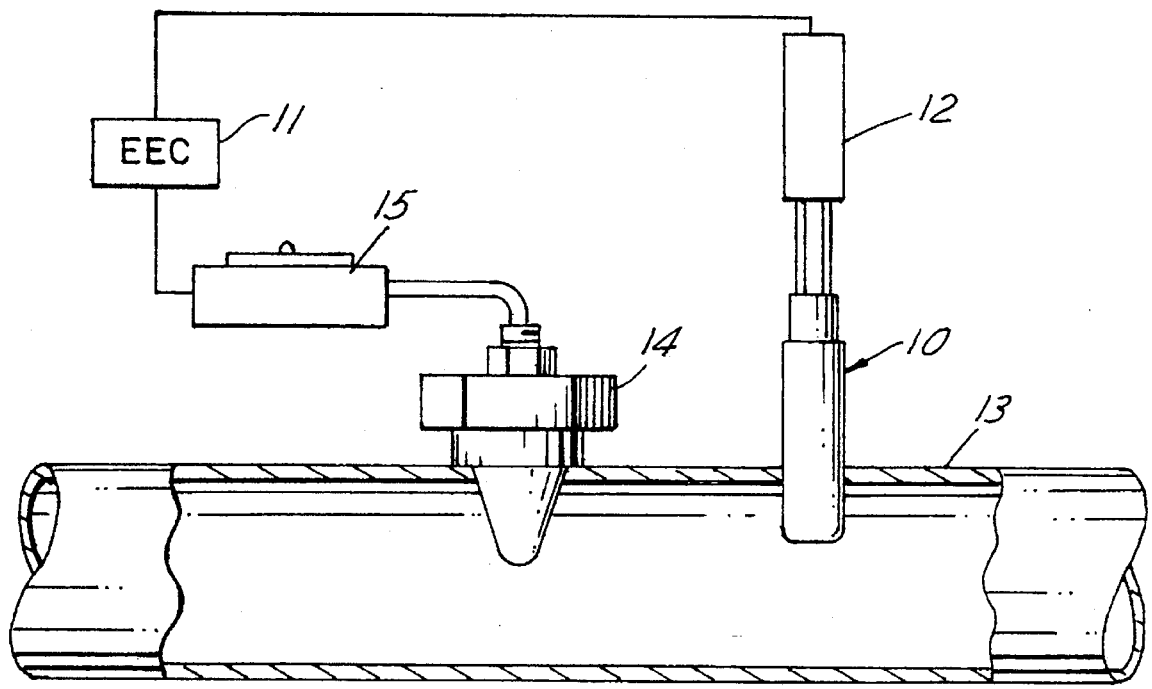
FIG. 1 is a schematic drawing of an exhaust gas vaporizer placed upstream of a heated exhaust gas oxygen sensor in a engine exhaust flow path in accordance with an embodiment of this invention.

FIG. 1 shows an heated exhaust gas oxygen (HEGO) sensor 10 which is coupled to an electronic engine control (EEC) unit 11 by a connector 12. A portion of HEGO sensor 10 is placed within an exhaust gas flow path 13. An exhaust gas vaporizer 14 is placed upstream of HEGO sensor 10 in exhaust gas flow path 13. Vaporizer 14 is joined with EEC unit 11 by a connector 15. The distance between vaporizer 14 and HEGO sensor 10 is optimized so that the turbulence in the gas flow from contacting vaporizer 14 is substantially reduced to laminar flow before reaching HEGO sensor 10. An alternate way to optimize this distance is to position vaporizer 14 so that the maximum amount of gas flow strikes HEGO sensor 10 after reaching vaporizer 14.

During startup, EEC unit 11 instructs HEGO sensor 10 to warm up to a preset operating temperature. The exhaust gas flowing through exhaust gas flow path 13 may contain liquid and fuel particles which would cause HEGO sensor 10 to crack during its rapid increase in temperature. This type of thermal shock phenomena limits the capability of current oxygen sensors with high wattage heaters. To enhance this capability and to combat thermal shock, this invention places vaporizer 14 upstream of HEGO sensor 10. With key on, vaporizer 14 can be turned on so that when the vehicle is started vaporizer 14 will be fully warmed up to remove water, fuel or liquid particles. During startup, EEC unit 11 controls current flow to cause vaporizer 14 to warm up. Much more power is applied to vaporizer 14 than to HEGO sensor 10. This will cause vaporizer 14 to heat much more quickly than HEGO sensor 10. Vaporizer 14 will remove liquid fuel and water particles in the exhaust gas flow thus avoiding thermal shock to HEGO sensor 10. As emission standards call for faster light-off, HEGO sensor 10 will be heated at a faster rate thus increasing the risk of thermal shock as well as increasing the importance of vaporizer 14.

Figure 2:
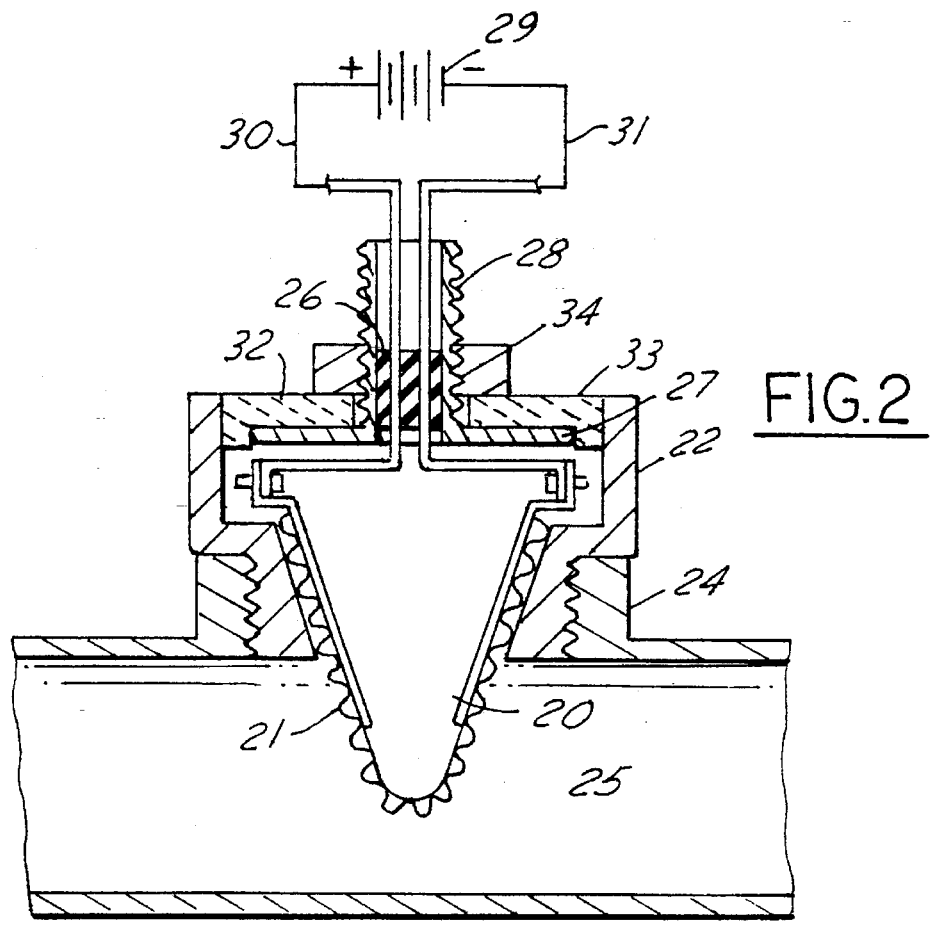
FIG. 2 is a cross sectional view of an exhaust gas stream vaporizer in accordance with an embodiment of this invention.

Referring to FIG. 2, a vaporizer includes a ceramic resistance heating element 20 packaged in a hermetically sealed tube 21 made of a high temperature material. The design of the tube insures the velocity profile is such that it directs warmer exhaust to HEGO sensor 10 to reduce thermal shock as well as faster light off. For example, the distance between the vaporizer and the sensor 10 is substantially just enough so that the turbulence in the exhaust gas flow at the vaporizer is substantially reduced before reaching HEGO sensor 10. Also, such distance is optimized by placing the vaporizer so that the presence of the vaporizer does not substantially reduce the exhaust gas flow passing adjacent to the exhaust gas oxygen sensor. Once the exhaust is heated, the vaporizer can be turned off.

A six-sided metal case 22 surrounds the upper portion of heating element 20 and sealed tube 21. Attached to metal case 22 are two ceramic appendages 32 and 33. Each appendage has a longer portion with a shorter portion attached at a right angle. A threaded portion 23 of metal case 22 is engaged with a threaded portion of a boss 24 which is mounted on a gas flow path 25. A metal plate 27 with a hollow screw post 28 is held down by ceramic pieces 32 and 33. Power for the vaporizer is supplied from a battery 29 through leads 30 and 31 which are fed through screw post 28 to heating element 20. A grommet 26 is placed within hollow screw post 28 at metal plate 27 to keep heating element 20 dry. A hold down nut 34 is tightened over screw post 28 to keep the assembly together.

Various modification and variations will no doubt occur to those skilled in the arts to which this invention pertains.

Such variations which basically rely on the teachings through which this disclosure has advanced the art are properly considered within the scope of this invention.

I claim:

1. An exhaust gas flow configuration for an internal combustion engine including:

an exhaust gas flow tube upstream of a catalytic converter;

an exhaust gas oxygen sensor positioned in the exhaust gas flow tube; and a vaporizer positioned in said exhaust gas flow tube upstream of the exhaust gas oxygen sensor for heating the exhaust flow striking the exhaust gas oxygen sensor, wherein said vaporizer includes, a hermetically sealed tube made of a high temperature material; a ceramic heater including a resistance wire enclosed within said tube connector to receive input providing electrical power; and said vaporizer being spaced from said exhaust gas oxygen sensor a sufficient distance to permit exhaust gas flowing past said vaporizer to return to a substantially laminar flow when passing said exhaust gas oxygen sensor and to maintain sufficient exhaust gas flow past said exhaust gas oxygen sensor to permit detection of oxygen in the exhaust gas by said exhaust gas oxygen sensor.

2. A method of sensing exhaust gas oxygen in an exhaust stream from an internal combustion engine including the steps of:

positioning a vaporizer in the exhaust gas stream;

positioning an oxygen sensor downstream in the vaporizer and upstream of a catalytic converter;

passing the exhaust gas by the vaporizer before the exhaust gas strikes the oxygen sensor;

energizing the vaporizer to vaporize any liquid in the exhaust gas stream, including applying an electric current to a resistance heater to promote vaporization of liquid in the exhaust gas stream, and adjusting the distance between the vaporizer and the exhaust gas oxygen sensor to be enough so that the turbulence in the exhaust gas flow at the vaporizer is substantially reduced before reaching the sensor, and is optimized by placing the vaporizer so that the presence of the vaporizer does not substantially reduce the exhaust gas flow passing adjacent to the exhaust gas oxygen sensor.

* * * * *